Dec. 29, 1931.  H. F. FISHER  1,838,929
ELONGATED HIGH VELOCITY TYPE TREATER
Filed Sept. 1, 1927    2 Sheets-Sheet 1
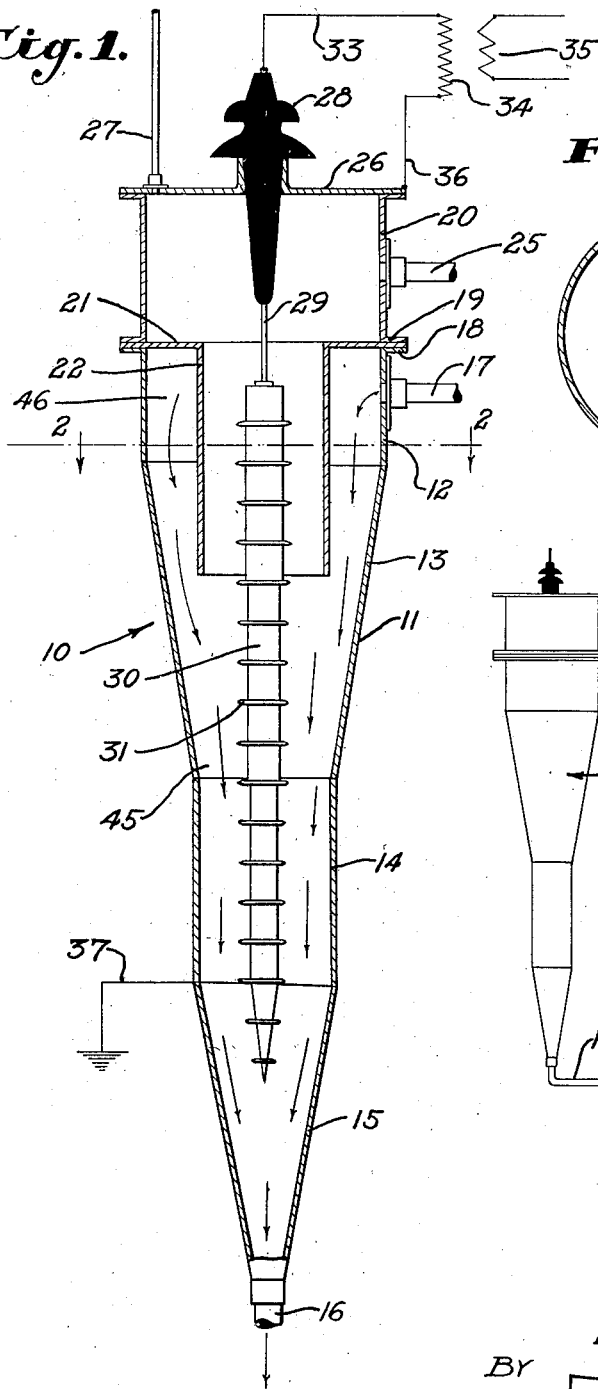
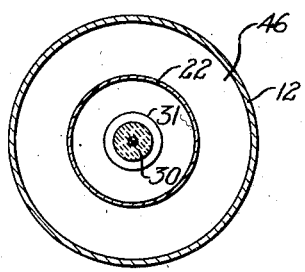
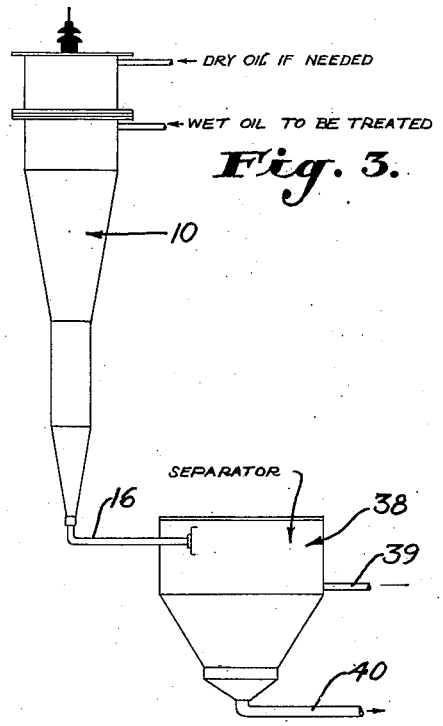
INVENTOR:
HARMON F. FISHER,
BY
ATTORNEY.

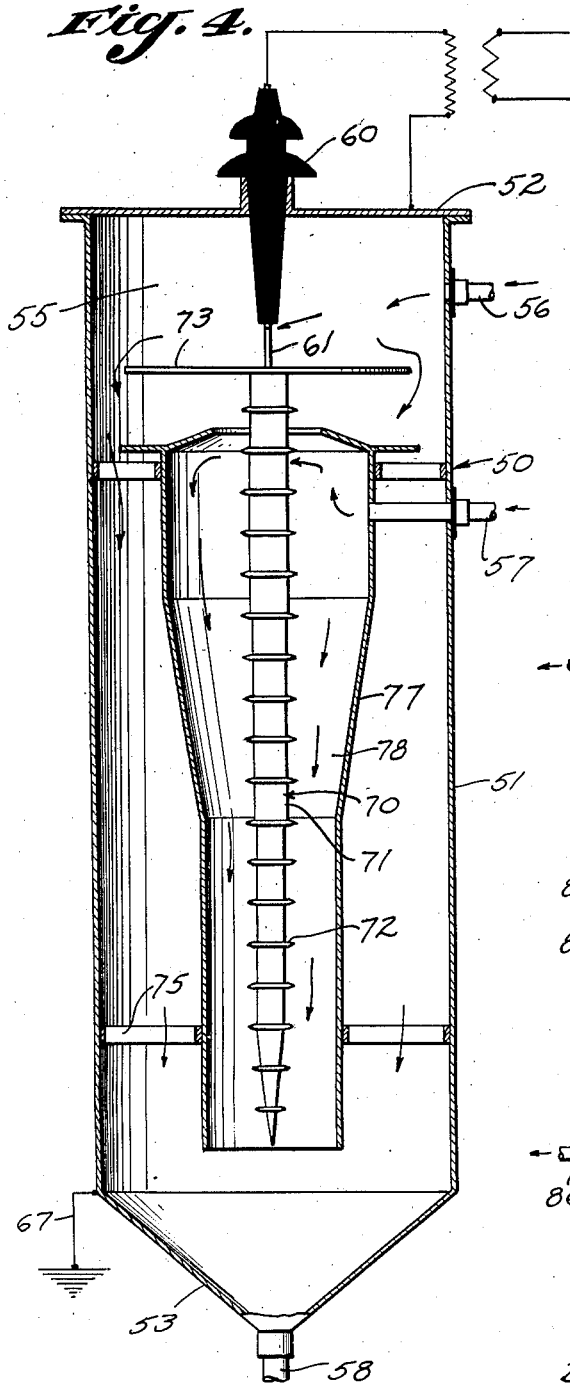
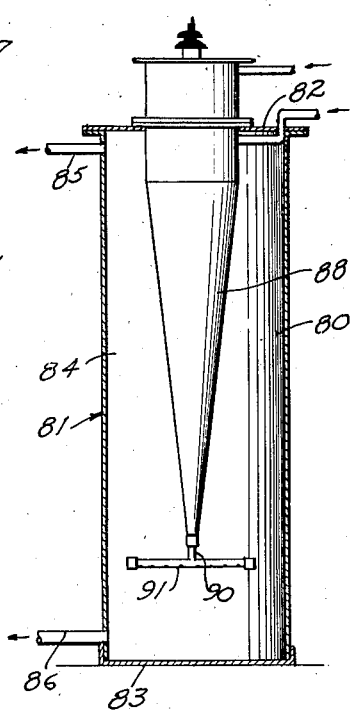

Patented Dec. 29, 1931

1,838,929

UNITED STATES PATENT OFFICE

HARMON F. FISHER, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

ELONGATED HIGH VELOCITY TYPE TREATER

Application filed September 1, 1927. Serial No. 216,863.

My invention relates to the art of electrically treating emulsions to separate the phases thereof. In this art considerable success has been had in electrically dehydrating peroleum and water emulsions. The treaters in general use for this purpose have a tank in which an electric treating field is set up between a pair of electrodes. The emulsion is passed through this field, which acts upon the water particles to agglomerate these into large masses which readily settle out of the emulsion. A settling space is also provided in this tank, into which space the emulsion passes after being treated in the electric field. The slow rate at which the agglomerated water particles settle from the emulsion in the settling space, however, limits the capacity of the treater. The treater tank must also be quite large in order to provide room for the settling space in addition to the electric treating apparatus, and this correspondingly increases the cost of the treater.

It is an object of my invention to provide a treater for electrically separating the phases of an emulsion, which will be relatively small in size, inexpensive to construct and of large capacity.

Certain emulsions have an excessive quantity of water and these are very difficult to treat electrically.

A further object of my invention is to provide a treater adapted to electrically dehydrate emulsions containing excessive amounts of water.

A still further object of my invention is to provide a treater in which a substantially intact dielectric barrier is maintained between the entrance bushing and the tank of the treater.

Another object of the invention is to provide a treater where the velocity of flow of the emulsion through the electric field increases as the treatment takes place in order to prevent water-rich masses from forming.

Yet another object of the invention is to provide a treater with a decreasing field as the treatment progresses so as to permit a higher voltage gradient across the treating zone.

Still a further object of this invention is to provide a novel method of dehydrating emulsion by passing this emulsion through a treating space of varying cross-sectional area.

Further objects and advantages will be made manifest in the following description and in the accompanying drawings in which a preferred embodiment of my invention is illustrated.

In the drawings,

Fig. 1 is a vertical sectional view diagrammatically illustrating a preferred embodiment of my invention.

Fig. 2 is a horizontal sectional view taken on the line 2—2 of Fig. 1.

Fig. 3 is a diagrammatic elevational view illustrating the utility of the treater shown in Fig. 1 in connection with a settling tank.

Fig. 4 is a vertical sectional view diagrammatically illustrating a modified form of the invention.

Fig. 5 is a diagrammatic view partly in section illustrating a modified form of the assembled separator.

Referring to the drawings, an emulsion treater 10, illustrated in Fig. 1, includes a lower shell 11 having an upper cylindrical shell portion 12, a tapering shell portion 13 extending downward therefrom, a lower cylindrical shell portion 14, and a lower tapering shell portion 15 which connects with a treated emulsion outlet pipe 16. Connecting with the cylindrical shell portion 12 is an emulsion inlet pipe 17. The shell portion 12 has a flange 18 at its upper end which cooperates with a lower flange 19 of an upper shell 20 to secure in place a horizontal plate 21. The plate 21 has a tubular neck 22 extending downward therefrom into the lower shell 11, for a purpose to be described later, the plate 21 and neck 22 forming a baffle through which the upper and lower shells are in communication. Connecting with the upper shell 20 is an alternative liquid inlet pipe 25. The upper end of the upper shell 20 is closed tightly by a cover plate 26 which has a gas outlet pipe 27 and an insulator 28 mounted therein.

Suspended from the insulator 28 by a conductor 29 is a tapering hygroscopic electrode 30, having flanges 31 extending therefrom at intervals throughout its length for a purpose to be described later. The lower end of the electrode 30 is disposed in the space within the lower tapering shell portion of the lower shell 11. The conductor 29 extends through the insulator 28 and connects with a conductor 33 which in turn connects to one terminal of a secondary 34 of a transformer 35. The other end of the secondary 34 is grounded to the upper shell 20 as by a conductor 36, while the lower shell 11 which is electrically connected with the upper shell 20 through the plate 21 is grounded to the earth as by a conductor 37. The treated emulsion outlet pipe 16 leads to a settling tank 38 or other separator which separates the phases of the emulsion, this separator having an oil outlet pipe 39 and a water outlet pipe 40.

While the treater of my invention may be used in the treatment of many different types of emulsions, it is particularly useful in the treating of water emulsions of petroleum and will therefore be described in this connection without, however, limiting it to such a use.

Before commencing the operation of the treater 10, the space within the lower and upper shells 11 and 20 is filled with a liquid of high dielectric quality which is preferably a petroleum of the same character as that contained in the emulsion to be treated. The transformer 35 is then energized so as to set up a high potential field between the electrode 30 and the shell of the treater 10. The distance between the electrode 30 and the lower shell 11 is small so as to form a treating space 45 which has an extremely high potential per unit-distance of gap. The emulsion is now passed through the pipe 17 into a space 46 between the neck 22 and the upper end of the lower shell 11. The emulsion flows downward from the space 46 into the space 45 at a fairly rapid rate and is treated by the high potential field in the space 45 in a relatively short time. This permits a fast stream of emulsion to be treated so as to agglomerate the water particles sufficiently so that when the emulsion passes through the pipe 16 into the settling tank 38, the phases will readily separate, the oil rising to the top and flowing from the pipe 39, and the water sinking to the bottom and being discharged through the pipe 40. The flanges 31 on the electrode 30 cause a high potential gradient to be set up adjacent this electrode which accelerates the treating action of the field.

The treater 10 is particularly useful for treating exceedingly wet emulsions which cannot be handled by other treaters. When such an emulsion is to be treated, an alterative fluid such as a dry oil of similar character to that in the emulsion, is supplied through the pipe 25 to the upper shell 20 from which this fluid flows downward through the neck 22 about the electrode 30. This alterative fluid mixes with the wet emulsion entering through the pipe 17 so as to prevent the formation of short-circuiting chains in the emulsion as it passes rapidly down through the treating space 45.

In treating an emulsion which does not have an excessive amount of water therein, a sufficient quantity of dry oil separates from the emulsion during its treatment in the treater 10 so as to rise upward through the neck 22 and maintain a dielectric barrier between the neck 22 and the electrode 30. This of course is essential to prevent flashing over between the electrode 30 and the neck 22. When the emulsion is excessively wet, however, it is necessary to supply an alterative fluid through the pipe 25 not only to maintain a dielectric barrier between the electrode 30 and the neck 22 but to dilute the emulsion to prevent flashing over in the treating space 45.

It is thus seen that I have provided an emulsion treater by which a stream of emulsion moving at a high velocity may be treated so as to separate the phases of the emulsion in a relatively short time. Thus a battery of several of the treaters 10 may be utilized to handle an exceedingly large flow of oil such as proceeds from a gusher which has been capped. The settling tank in this case is very large so as to handle the treating emulsion from the entire battery of treaters 10.

Referring specifically to Figs. 4 and 5, a modified form of my treater is indicated by the numeral 50. The treater 50 has a tubular shell 51, the upper and lower ends of which are tightly closed by the top plate 52 and a bottom plate 53. Formed within the shell 51 is a treater chamber 55. Connecting with the shell 51 so as to open into the chamber 55 is a dielectric fluid-supply pipe 56. Extending through the shell 51 into an intermediate portion of the chamber 55 is an incoming wet-oil pipe 57. Leading from the lower end of the chamber 55 and connected with the bottom plate 53 is a treated-fluid outlet pipe 58.

Mounted centrally in the top plate 52 is an insulator 60 through which a conductor 61 extends, the outer end of the conductor 61 connecting to one end of a secondary 62 of a transformer 63. The other end of the secondary 62 is grounded as by a conductor 64 to the shell 51 which in turn is grounded by a conductor 67 to the earth. The conductor 61 is in the form of a rod which extends axially downward almost throughout the length of the treater chamber 55. Formed upon and supported by the conductor 61 is a long and slender live electrode 70 which is preferably formed of short hygroscopic cylinders 71 which are stacked upon the conductor 61, as shown, with discs 72 of hygroscopic material interspersed between each adjacent pair of cylinders 71. The respective diameters of the cylinders 71 and the discs 72 gradually decrease toward the lower end of the electrode 70. Supported about the conductor 61 upon the upper end of the electrode 70 is a dielectric fluid-deflecting disc 73. Supported within the chamber 55 by arms 75, extending inward from the shell 51, is a tapering barrier 77 which surrounds the electrode 70 to form a tapering treating space 78 between the electrode and the barrier. Mounted on the top of the barrier 77 is an annular baffle plate 79 which partially closes the annular space between the barrier 77 and the shell 51. The incoming wet-oil pipe 57 connects with the barrier 77 so as to open into the upper end of the treating space 78.

It is understood that the treated-fluid pipe 58 may lead to any suitable separating tank such as the separator 38 shown in Fig. 3.

The operation of the treater 50 is as follows:

The treater 50 is especially designed for treating petroleum emulsions which are fairly dry and which therefore do not respond favorably to treatment in the treaters of the usual form which are designed to be employed with emulsions having a fairly high water content. Before commencing the operation of the treater, the chamber 55 is filled with a dielectric fluid which is preferably a dehydrated petroleum of the character of the petroleum in the emulsion to be treated. The transformer 63 is now energized so as to impose a relatively high potential between the electrode 70 and the shell 51 which comprises a grounded electrode of the treater 50. The wet oil to be treated is now passed through the pipe 57 into the upper end of the treating space 78. This oil being heavier than the dielectric oil disposed in this space, it will sink and pass downward through the space 78. The baffle 79 tends to check any flow of wet oil over the top of the barrier 77 and down the annular space between this barrier and the shell. The pressure of the incoming dielectric oil further tends to prevent this up-flow of wet oil. The function of the barrier 77 is to cause the emulsion to pass at a faster rate through the space 78 as the treatment thereof progresses. At the same time short-circuiting chains of water particles are prevented from forming by the increasing velocity of the emulsion.

In order to maintain a substantially water-free dielectric barrier in the upper end of the chamber 55, a small flow of dielectric fluid is maintained from the pipe 56 into the chamber 55. This dielectric fluid forms a barrier about the conductor 61 and is deflected by the disc 73 so as to flow around the baffle 79 downward between the shell 51 and the barrier 77 into the lower end of the chamber 55 where it mixes with the treated emulsion and is discharged through the treated-fluid pipe 58. As previously stated, the pipe 58 leads to a separator where the treated emulsion may stand a sufficient length of time for the water masses to entirely separate out by gravity from the oil.

Referring to Fig. 5, a modified form of separator tank is indicated by the numeral 80. The separator 80 includes a cylindrical shell 81, the upper and lower ends of which are closed by the top and bottom plates 82 and 83 respectively. Formed within the shell 81 is a separator chamber 84 from the upper and lower ends of which lead oil and water outlet pipes 85 and 86 respectively. Supported by the top plate 82 and extending downward into the chamber 84 is an electric treater 88 which may be of the same general type as either of the treaters 10 or 50, described above. Disposed in the lower end of the chamber 84 and connected to the treated-fluid discharge pipe 90 of the treater 88 is a treated-fluid discharge manifold 91. As the treater 88 is operated, the treated fluid is discharged from the manifold 91 so as to eventually fill the chamber 84. The flow of emulsion through the treater 88 is maintained at such a rate that the treated emulsion disposed in the chamber 84 has ample time to separate by gravity so that the oil will flow out of the oil outlet pipe 85 and the water will flow out of the outlet pipe 86. The separator 80 is of special advantage in that it permits an extremely compact assembly between the treater and the separator tank.

While I have described my invention in particular relation to the dehydrating of petroleum emulsions, it is to be understood that my treater has utility in other fields also. Neither is its usefulness limited only to the dehydration of an emulsion, for various other fluids may be advantageously treated therein for the purpose of separating certain of the constituents thereof. The appended claims, therefore, are not intended to be limited to the treatment only of a petroleum emulsion.

I claim as my invention:

1. In an electrical treater, the combination of: a lower shell; an upper shell communicating with said lower shell; an insulator extending into said upper shell; a central electrode supported by said insulator and cooperating with said lower shell to define a treating space; means for supplying the fluid to be treated to said treating space; and means for simultaneously supplying a dielectric fluid to said upper shell.

2. In an electrical treater, the combination of: a lower shell; an upper shell; an electrode extending into said lower shell, there being a treating space therebetween; and a baffle between said shells for guiding into said treating space a dielectric fluid supplied to said upper shell and a fluid to be treated supplied to said lower shell.

3. In combination: a shell defining an electrode; a central electrode extending a material distance into said shell and cooperating therewith in defining a treating space; a baffle around said central electrode and extending a short distance into said treating space; means for supplying a fluid to be treated to the space between said baffle and said shell; and means for supplying a dielectric fluid to the space between said baffle and said central electrode, said fluids joining at the end of said baffle and passing through said treating space.

4. In combination: a tapered shell defining a grounded electrode; a tapered central electrode extending into said shell in a manner to form a relatively long tapered treating space therebetween; and means for introducing emulsion into the larger end of said treating space, the velocity of said emulsion and the voltage gradient to which it is subjected increasing as said emulsion moves through said treating space.

5. A method of treating an emulsion which comprises: forcing a body of emulsion through an electric field of increasing voltage gradient; and correspondingly increasing the velocity thereof during the passage through said field to prevent the formation of short-circuiting chains across said field.

6. In an electric treater, the combination of: a relatively long tubular shell providing a substantially closed space; a relatively long electrode extending through said space and cooperating with said shell in defining a treating space; inlet means communicating with one end of said substantially closed space for supplying emulsion to one end of said treating space, said emulsion moving through said treating space at a relatively high velocity; means communicating with the other end of said substantially closed space for conducting the treated emulsion from said treater; and means for introducing a dielectric into said substantially closed space whereby a portion of said dielectric flows through said treating space along with said emulsion, said dielectric being mixed with the constituents of said emulsion and withdrawn therewith.

7. In an electric treater, the combination of: a shell; an electrode extending into said shell; an insulator for supporting said electrode in said shell; walls defining a space surrounding said electrode and communicating with the space between said electrode and said shell; means for introducing a dielectric into said space defined by said walls; a fluid-conducting pipe communicating with the space between said walls and said shell; and means for establishing a difference in potential between said electrode and said shell whereby treatment of said fluid flowing through said pipe is effected.

8. A method of treating an emulsion, the dispersed phase of which may be an electrically conducting medium, which method comprises: forcing the constituents completely through a relatively long treating space at such rate that separation of the constituents is substantially prevented; establishing an electric field in said treating space; preventing short-circuiting of said electric field by increasing the velocity of said constituents therein as treatment of said emulsion progresses; and subsequently separating said constituents.

9. In combination: a shell; an electric treater supported in said shell, said treater providing a substantially closed chamber; a discharge means conducting liquid from the lower end of said chamber into the lower end of said shell, said discharge means forming the only communication between said chamber and said shell; means in said treater providing an electric field; means for moving a high velocity stream of emulsion into one end of said field and from the other end of said field and through said discharge means without material separation of the constituents taking place, said constituents separating in the space in said shell and around said treater; and means for withdrawing said constituents from opposite ends of said space.

10. In an electric treater, the combination of: a pair of electrodes defining a treating space therebetween which decreases in cross-sectional area toward one end thereof; fluid inlet means communicating with that end of said treating space which is larger in cross-section and forcing fluid therethrough toward the end thereof which is of smaller cross-section whereby said fluid increases in velocity as treating continues; means for forming areas of maximum potential gradient in said space adjacent one of said electrodes; means for discharging a dielectric liquid through said areas of maximum potential gradient during the passage of said fluid through said space; and fluid outlet means communicating with said end of said treating space which is of smaller cross-section and conducting the treated fluid in its entirety from said treater.

In testimony whereof, I have hereunto set my hand at Los Angeles, California, this 26th day of August, 1927.

HARMON F. FISHER.